(12) United States Patent
Shu et al.

(10) Patent No.: US 11,655,103 B2
(45) Date of Patent: May 23, 2023

(54) TRANSPORT APPARATUS FOR TRANSPORTING PLATE

(71) Applicant: RUENTEX ENGINEERING & CONSTRUCTION CO., LTD., Taipei (TW)

(72) Inventors: Kun-Jung Shu, Taipei (TW); Chun-Ju Huang, Taipei (TW)

(73) Assignee: RUENTEX ENGINEERING & CONSTRUCTION CO., LTD., Taipei (TW)

( * ) Notice: Subject to any disclaimer, the term of this patent is extended or adjusted under 35 U.S.C. 154(b) by 177 days.

(21) Appl. No.: 17/210,505

(22) Filed: Mar. 24, 2021

(65) Prior Publication Data

US 2021/0300683 A1 Sep. 30, 2021

(30) Foreign Application Priority Data

Mar. 27, 2020 (TW) .................................. 109110392

(51) Int. Cl.
*B65G 13/04* (2006.01)
*B65G 13/06* (2006.01)
(Continued)

(52) U.S. Cl.
CPC ............. *B65G 13/04* (2013.01); *B65G 13/06* (2013.01); *B65G 13/12* (2013.01); *B65G 39/18* (2013.01);
(Continued)

(58) Field of Classification Search
CPC ........ B65G 13/04; B65G 13/06; B65G 13/12; B65G 39/18; B65G 2201/0217;
(Continued)

(56) References Cited

U.S. PATENT DOCUMENTS 3,844,399 A * 10/1974 Sellers, Jr. ......... B65G 21/2054
144/253.7
5,005,692 A *  4/1991 Borzym ................. B21D 43/09
414/746.7
(Continued)

FOREIGN PATENT DOCUMENTS

CN  107747402 A   3/2018
CN  208618811 U   3/2019
(Continued)

OTHER PUBLICATIONS

German Office Action dated Apr. 13, 2021, in counterpart German application DE10 2020 119 879.5, 5 pages in German.

*Primary Examiner* — Mark A Deuble
(74) *Attorney, Agent, or Firm* — Juan Carlos A. Marquez; Marquez IP Law Office, PLLC

(57) ABSTRACT

A transport apparatus for transporting a plate comprising: a shell, a drive system, and a first set of rollers. The shell comprises an entrance and an exit that are disposed opposite to each other in relation to the shell. The drive system is disposed on the shell. The first set of rollers is disposed in the shell. The first set of rollers comprises: a first roller and a first adjustment roller. The first roller is electrically coupled to the drive system and configured to be rotated by the drive system. The first adjustment roller is movably disposed in the shell and is configured to adjust a first distance between the first roller and the first adjustment roller.

17 Claims, 8 Drawing Sheets

(51) Int. Cl.
*B65G 13/12* (2006.01)
*B65G 39/18* (2006.01)

(52) U.S. Cl.
CPC ............... *B65G 2201/022* (2013.01); *B65G 2201/0217* (2013.01); *B65G 2201/0223* (2013.01)

(58) Field of Classification Search
CPC ...... B65G 2201/022; B65G 2201/0223; B65G 13/065; E04G 19/003
USPC ........................................................ 198/624
See application file for complete search history.

(56) References Cited

U.S. PATENT DOCUMENTS

| | | | | |
|---|---|---|---|---|
| 5,020,579 | A | * | 6/1991 | Strong ................... B27B 25/02 241/34 |
| 5,088,532 | A | * | 2/1992 | Eggers ................. B27L 11/002 241/101.76 |
| 5,762,332 | A | * | 6/1998 | Haroutel ............... B65H 5/062 271/274 |
| 5,903,954 | A | * | 5/1999 | Gajewski ................ B08B 6/00 156/364 |

FOREIGN PATENT DOCUMENTS

| | | |
|---|---|---|
| DE | 000001068603 A | 11/1959 |
| DE | 212011100058 U1 | 1/2013 |
| DE | 102017106309 B3 | 2/2018 |

\* cited by examiner

… (1)

TRANSPORT APPARATUS FOR TRANSPORTING PLATE

TECHNICAL FIELD

The present disclosure relates to a transport apparatus, and in particular, to a transport apparatus for transporting a plate.

BACKGROUND

A formwork is a mold for forming concrete according to geometric dimensions thereof for a reinforced concrete structure. First, concrete may be poured into a space formed by the formwork. After the concrete is formed after hardening, the formwork is removed. The formwork, while ensuring accuracy of shape, position, and size of the structure, requires requisite strength, rigidity, and stability, and must be easily assembled and removed for repeated use. However, the wood or metal formwork can weigh up to 35 kilograms (kg), resulting in considerable difficulty, time spent, and even potential injury for workers and operators, especially if the formwork is to be relocated, even between floors or levels. The result is detrimental to safety and well-being of workers and can adversely affect costs and efficiency.

Therefore, there has been a long-time need in the industry to provide a formwork transport apparatus that can greatly reduce labor and risk, while improving construction efficiency and cost.

SUMMARY OF INVENTION

To this end, the present disclosure in an embodiment provides a transport apparatus for transporting a plate. The transport apparatus comprises a shell, a drive system, and a first set of rollers. The shell comprises an entrance and an exit that are disposed opposite to each other in relation to the shell. The drive system is disposed on the shell. The first set of rollers is disposed in the shell. The first set of rollers comprises a first roller and a first adjustment roller. The first roller is electrically coupled to the drive system and configured to be rotated by the drive system. The first adjustment roller is movably disposed in the shell and is configured to adjust a first distance between the first roller and the first adjustment roller.

BRIEF DESCRIPTION OF THE DRAWINGS

The present disclosure as well as a preferred mode of use, further objectives, and advantages thereof will be best understood by referring to the following detailed description of illustrative embodiments in conjunction with the accompanying drawings, wherein.

DETAILED DESCRIPTION

Figure 1:
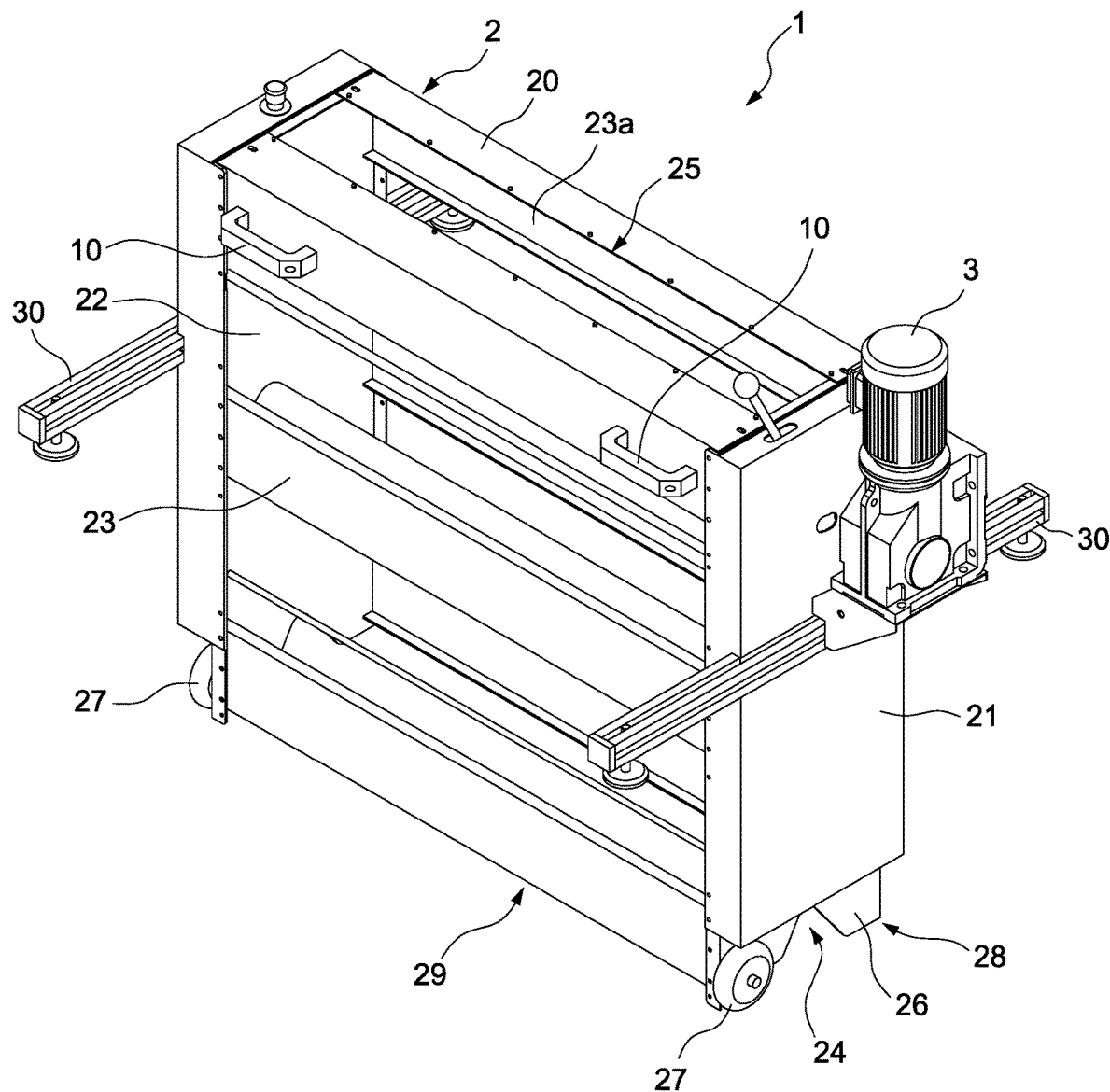
FIG. 1 is a perspective view of an embodiment of the present disclosure.

FIG. 1 shows a transport apparatus 1 for transporting a plate in an embodiment of the present disclosure. During operation, the transport apparatus 1 is removably disposed in a through hole in one of the floors under construction, for example, in an unfinished elevator shaft of a building, and the transport apparatus 1 is configured to transport a plate from a lower floor to the floor immediately above said lower floor. The plate transported by the transport apparatus 1 may be a timber or metal formwork, for example, an aluminum formwork. In an embodiment, the total weight of a timber formwork may be between 10 kg to 20 kg, the length of the timber formwork may be, for example, between 1800 millimeters (mm) to 1900 mm, and the width of the timber formwork may be, for example, 600 mm to 915 mm. In an embodiment, the total weight of an aluminum formwork is between 15 kg to 34 kg, the length of the aluminum formwork is between 2000 mm to 2500 mm, and the width of the aluminum formwork is between 300 mm to 700 mm. In the foregoing embodiments, the thickness of a formwork may be tween 10 mm to 75 mm. The size of a formwork applied to the present disclosure is not limited to the foregoing embodiments, and the size of the transport apparatus 1 may be adjusted according to the size of the formwork.

In this embodiment, the transport apparatus 1 includes a shell 2 and a drive system 3. The shell 2 includes a top plate 20, a first side plate 21, a second side plate 22, a front plate 23, and a rear plate 23a. The front plate 23 and the rear plate 23a are disposed relative to each other at opposing ends of the first side plate 21 and the second side plate 22, to jointly form an accommodating space. The top plate 20 is disposed above the top ends of the first side plate 21, the second side plate 22, the front plate 23, and the rear plate 23a. In this embodiment, the transport apparatus 1 further includes two supporting guide rails 30, detachably fixed on the first side plate 21 and the second side plate 22. During operation, the supporting rails 30 may be disposed at circumferential edges of the through hole of the floor, to support the shell 2 and components in the shell 2 so that the shell 2 is located in the through hole. The shell 2 is movable along the supporting guide rails 30, so as to occupy a desired position in the through hole.

The drive system 3 is disposed on the shell 2. In this embodiment, the drive system 3 is disposed on the first side plate 21 of the shell 2, and a drive shaft (not shown) of the drive system 3 penetrates the first side plate 21 of the shell 2 from a side of the drive system 3, and enters into the shell 2 to actuate a first roller 40 and/or a second roller 50 (see FIG. 2). The drive system 3 may include a controller, a motor, and a power supply assembly (not shown). The controller may include a programmable logic controller (PLC) and a frequency converter. The motor may be an IP55 or IPX4 waterproof motor, which may output 0.75 kW. The power supply assembly is configured to supply power to the controller and the motor.

Figure 2:
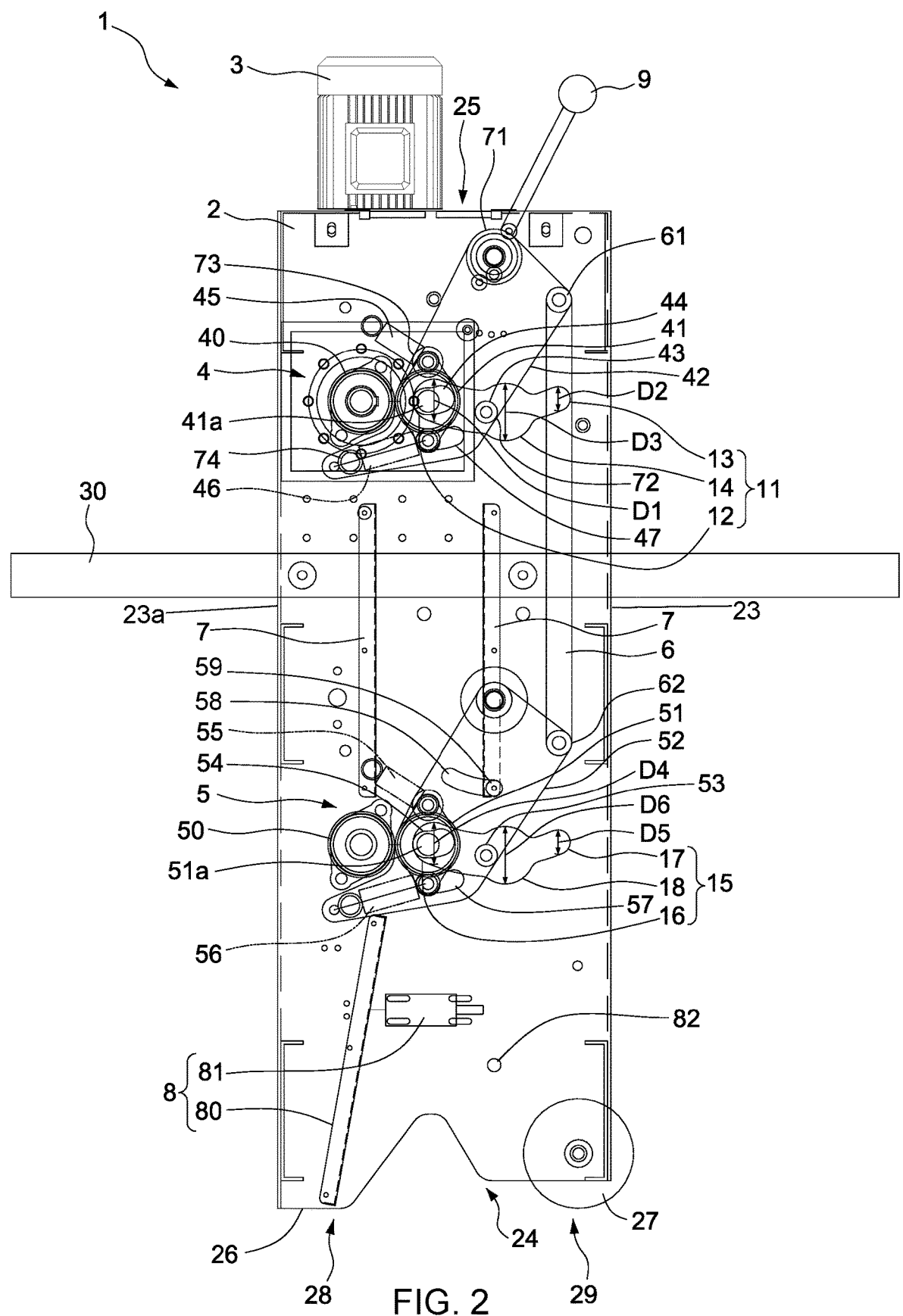
FIG. 2 is a schematic view of the embodiment of the present disclosure.

FIG. 2 is a schematic view of a transport apparatus 1 according to an embodiment of the present disclosure. As shown in FIG. 1 and FIG. 2, the shell 2 further includes an entrance 24 and an exit 25, disposed opposite to each other. The entrance 24 is disposed at the bottom of the shell 2, and the exit 25 is formed in the top plate 20. In view of this, a plate 100 may be transported into the transport apparatus 1 from the entrance 24, and then out of the transport apparatus 1 via exit 25.

In this embodiment, the bottom of the shell 2 has a first side 28 and a second side 29 provided at two opposing sides of the entrance 24. The transport apparatus 1 further includes a supporting member 26 and two wheels 27. The supporting member 26 may be a plate, fixed on the first side 28 of the bottom of the shell 2. The wheels 27 are disposed on the second side 29 of the bottom. In addition, the shell 2 further includes a plurality of handles 10. In some embodiments, the handles 10 are disposed on the front plate 23 and/or the rear plate 23a. In use, a user may use the handles 10 to lift the supporting member 26 on the first side 28, separating the supporting member 26 from the floor and the transport apparatus 1 is supported on the wheels 27. Then, the transport apparatus 1 can be moved to a predetermined position.

Figure 3:
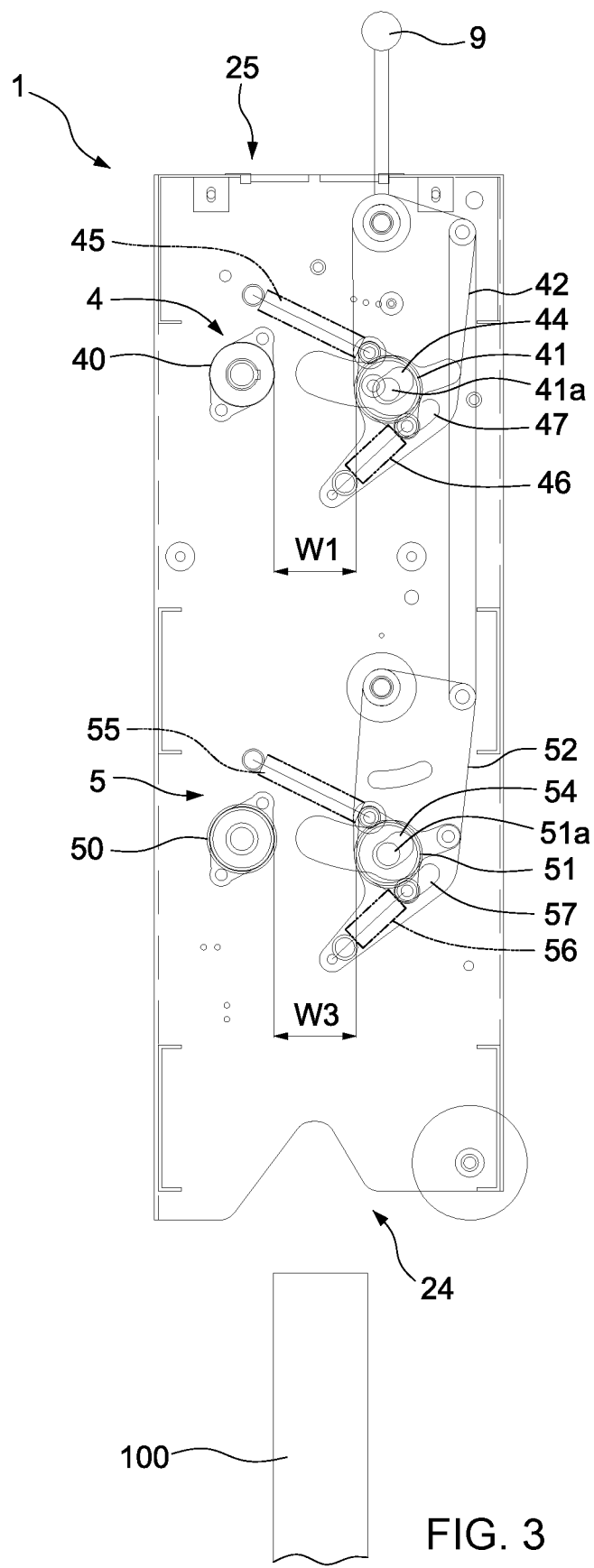
FIG. 3 is a schematic view showing a first action of the embodiment of the present disclosure.

In this embodiment as shown in FIG. 2, the transport apparatus 1 further includes a first set of rollers 4, disposed in the accommodating space of the shell 2, and between the entrance 24 and the exit 25. The first set of rollers 4 includes a first roller 40 and a first adjustment roller 41. Two ends of the first roller 40 and two ends of the first adjustment roller 41 are rotatably disposed on the first side plate 21 and the second side plate 22 (as shown in FIG. 1) of the shell 2 respectively. The first roller 40 is electrically coupled to and configured to be rotated by the drive system 3. The first adjustment roller 41 disposed in the shell 2 is movable in relation to the first roller 40. A user may adjust a first distance between the first roller 40 and the first adjustment roller 41 by changing the position of the first adjustment roller 41. In the state shown in FIG. 2, the first roller 40 and the first adjustment roller 41 are in contact, and the first distance is zero. FIG. 3 is a schematic view showing a first action of a transport apparatus 1 according to an embodiment of the present disclosure. In the state shown in FIG. 3, the first roller 40 and the first adjustment roller 41 are separated to form a first distance W1 therebetween.

The first set of rollers 4 includes a first frame 42, including a first side 71, a second side 72, a third side 73, and a fourth side 74. The first side 71 is pivotally disposed in the shell 2 such that the first frame 42 may pivot in the shell 2 with the first side 71 as the pivoting point. In this embodiment, the first set of rollers 4 also includes a controlling rod 9, with one end fixed to the first side 71 of the first frame 42. Thereby, a user may pivot the first frame 42 effortlessly through a leverage provided by the controlling rod 9, to cause the first adjustment roller 41 to move toward or away from the first roller 40. In another embodiment of the present disclosure, the transport apparatus 1 may include a linear motor for moving the controlling rod 9 progressively.

As shown in FIG. 2, the shell 2 is provided with a first slot 11. A first portion of the first adjustment roller 41 is disposed in the first slot 11, and the first adjustment roller 41 is movable along the first slot 11. The first slot 11 is generally arc-shaped and has a first end 12, a second end 13, and a middle portion 14. The first end 12 of the first slot 11 is disposed opposite to the second end 13, and the middle portion 14 of the first slot 11 is disposed between the first end 12 and the second end 13.

The first frame 42 of the first set of rollers 4 further includes a first positioning member 43 disposed on the second side 72 of the first frame 42, and also in the first slot 11. In some embodiments, the first positioning member 43 is a pin. The first adjustment roller 41 is movable between the first end 12 and the middle portion 14 of the first slot 11, and correspondingly the first positioning member 43 is movable between the middle portion 14 and the second end 13 of the first slot 11. In this embodiment, a maximum radial dimension D2 of the second end 13 of the first slot 11 is less than a maximum radial dimension D1 of the first end 12 of the first slot 11 and a maximum radial dimension D3 of the middle portion 14. With such configuration of the first slot 11, the first adjustment roller 41 is prevented from entering the second end 13 of the first slot 11 so that the range of the first distance W1 is controlled.

As shown in FIG. 2, the first set of rollers 4 includes a first adjustment spring 45 and a first compression spring 46. Two opposing ends of the first adjustment spring 45 are respectively connected to the shell 2 and the third side 73 of the first frame 42. Two opposing ends of the first compression spring 46 are respectively connected to the fourth side 74 of the first frame 42 and the first adjustment roller 41. In addition, the end of the first compression spring 46 connected to the first adjustment roller 41 is also located in a first guide slot 47 of the first frame 42. The initial position of the portion of the first adjustment roller 41 connected to the first compression spring 46 is located on a left side of the first guide slot 47 as shown in FIG. 2.

The first frame 42 has a first adjustment slot 44 therein. The first adjustment roller 41 has a first portion and a second portion opposite to the first portion. In this embodiment, the first portion and the second portion of the first adjustment roller 41 are respectively two opposite sections of a same rod 41a of the first adjustment roller 41. In other words, the first portion of the first adjustment roller 41 is located in the first slot 11 of the shell 2, and the second portion of the first adjustment roller 41 is located in the first adjustment slot 44 of the first frame 42. That is, the first adjustment roller 41 is sandwiched between the shell 2 and the first frame 42. More specifically, a part of the first adjustment roller 41 is disposed on a first side surface of the shell 2, and the other part of the first adjustment roller 41 is disposed on a second side surface of the first frame 42. The first side surface of the shell 2 and the second side surface of the first frame 42 are disposed opposite to each other. When the first frame 42 moves, the first adjustment roller 41 is accordingly actuated and the first and second portions of the first adjustment roller 41 move in the first slot 11 and the first adjustment slot 44 respectively (referring to FIG. 3). Since the first adjustment roller 41 is connected to one end of the first compression spring 46, and subject to an elastic force created by the deformation of the first compression spring 46, whenever the first adjustment roller 41 is moved, it is returned to its initial position (i.e., the left side of the first adjustment slot 44 of the first frame 42) as shown in FIG. 2.

In this embodiment, the transport apparatus 1 further includes a second set of rollers 5 and a link rod 6. The second set of rollers 5 is disposed in the shell 2. The link rod 6 has a first end 61 and a second end 62. The first end 61 of the link rod 6 is pivotally connected to the first set of rollers 4, and the second end 62 of the link rod 6 is pivotally connected to the second set of rollers 5, so as to link the first set of rollers 4 to the second set of rollers 5. Specifically, when the first frame 42 of the first set of rollers 4 pivots, the link rod 6 moves in a vertical direction to drive the second set of rollers 5 and thus the first set of rollers 4 and the second set of rollers 5 move synchronously. Moreover, in this embodiment, the first set of rollers 4 is disposed near the exit 25, and the second set of rollers 5 is disposed between the first set of rollers 4 and the entrance 24 of the shell 2. The distance between the first set of rollers 4 and the second set of rollers 5 is less than the length of the plate 100 (referring to FIG. 4 to FIG. 8).

In this embodiment, the second set of rollers 5 may further include a second roller 50 and a second adjustment roller 51. The second roller 50 is electrically coupled to and is configured to be rotated by the drive system 3. The second adjustment roller 51 is movably disposed in the shell 2 in relation to the second roller 50, to adjust a second distance between the second roller 50 and the second adjustment roller 51. In this embodiment, the first distance is set to be substantially equal to the second distance. As shown in FIG. 2, the second roller 50 and the second adjustment roller 51 are in contact, and the second distance is zero. As shown in FIG. 3, the second roller 50 and the second adjustment roller 51 are separated and a second distance W2 is formed therebetween.

As shown in FIG. 2, the second set of rollers 5 further includes a second frame 52, and one end of the second frame is pivotally disposed in the shell 2. The second adjustment roller 51 is disposed on the second frame 52. The shell 2 has a second slot 15. A first portion of the second adjustment roller 51 is disposed in the second slot 15, and the second adjustment roller 51 is movable in the second slot 15. The second slot 15 is generally arc-shaped. The second slot 15 has a first end 16, a second end 17, and a middle portion 18. The first end 16 of the second slot 15 is disposed opposite to the second end 17 of the second slot 15, and the middle portion 18 is located between the first end 16 and the second end 17 of the second slot 15.

The second frame 52 includes a second positioning member 53 thereon, and the second adjustment roller 51 is movable between the first end 16 and the middle portion 18 of the second slot 15. The second positioning member 53 is movable between the middle portion 18 and the second end 17 of the second slot 15. In this embodiment, a maximum radial dimension D4 of the second end 17 of the second slot 15 is less than a maximum radial dimension D5 of the first end 16 of the second slot 15 or a maximum radial dimension D6 of the middle portion 18. Under this arrangement, the second adjustment roller 51 is prevented from entering the second end 13 of the second slot 15.

The second set of rollers 5 may further include a second adjustment spring 55 and a second compression spring 56. Two opposing ends of the second adjustment spring 55 are respectively connected to the shell 2 and the second frame 52. Two opposing ends of the second compression spring 56 are respectively connected to the second frame 52 and the second adjustment roller 51. In addition, the end of the second compression spring 56 connected to the second adjustment roller 51 is also located in a second guide slot 57 of the second frame 52. The initial position of the portion of the second adjustment roller 51 connected to the second compression spring 56 is located on a left side of the second guide slot 57 as shown in FIG. 2.

The second frame 52 has a second adjustment slot 54 therein. The second adjustment roller 51 has a first portion and a second position opposite to the first portion. In this embodiment, the first portion and the second portion of the second adjustment roller 51 are respectively two different sections of the same rod 51a of the second adjustment roller 51. More specifically, the first portion of the second adjustment roller 51 is located in the second slot 15 of the shell 2, and the second portion of the second adjustment roller 51 is located in the second adjustment slot 54 of the second frame 52. That is, the second adjustment roller 51 is sandwiched between the shell 2 and the second frame 52. When the second frame 52 is moved, the first and second portions of the second adjustment roller 51 are accordingly actuated to move in the second slot 15 and the second adjustment slot 54 respectively. As described, the second adjustment roller 51 is connected to an end of the second compression spring 56. Thus, when moving in the second slot 15, the second adjustment roller 51 is subject to elastic force created by the deformation of the second compression spring 56, such that whenever the second adjustment roller 51 is moved, it returns to its initial position (i.e., the left side of the second adjustment slot 54 of the second frame 52) as shown in FIG. 2.

The second frame 52 has a curved guide slot 58 and a guide pillar 59 positioned in the curved guide slot 58. The radius of curvature of the curved guide slot 58 is generally equal to the distance between the guide pillar 59 and the pivoting point P of the second frame 52. The guide pillar 59 extends from the shell 2 into the curved guide slot 58. When the second frame 52 rotates, the curved guide slot 58 of the second frame 52 rotates accordingly, and the guide pillar 59 remains still and will be relatively located in a different position in the curved guide slot 58. The arrangement of the guide pillar 59 and the curved guide slot 58 ensures the correct rotating path of the second frame 52.

In an embodiment of the present disclosure, the plate 100 is made of wood, the first roller 40, the first adjustment roller 41, the second roller 50, and the second adjustment roller 51 are made of metal, and the surfaces of these rollers have embossed patterns for improving the friction and adhesion between the surfaces of these rollers and the plate 100. In another embodiment of the present disclosure, the plate 100 is made of metal, for example, an aluminum plate, the rollers are made of rubber (for example, Polyvinyl alcohol (PVA)), and the hardness may be 60 (shore hardness) HS to 70 HS. That is, the materials of the first roller 40, the first adjustment roller 41, the second roller 50, and the second adjustment roller 51 are determined based on the material of the to-be-transferred plate 100.

In an embodiment of the present disclosure, the transport apparatus 1 includes at least one guide plate 7, disposed in the shell 2 and located between the first set of rollers 4 and the second set of rollers 5 for guiding the transportation of the plate 100. In this embodiment, there are two guide plates 7, one disposed close to the front plate 23 of the transport apparatus 1, and the other close to the rear plate 23a of the transport apparatus 1. The two guide plates 7 form a path between the first set of rollers 4 and the second set of rollers 5 for adjusting a movement path of the plate 100. In other words, if the plate 100 is moved obliquely upward from the second set of rollers 5 and contacts the guide plates 7, the guide plates 7 may guide the plate 100 to return to its predetermined path so as to properly enter the first set of rollers 4. In addition, the distance between the two guide plates 7 shown in FIG. 2 is merely schematic, and may be adjusted according to the actual needs.

In an embodiment of the present disclosure, the transport apparatus 1 includes a detection apparatus 8, disposed between the second set of rollers 5 and the entrance 24 of the shell 2. The detection apparatus 8 is electrically connected to the drive system 3. The detection apparatus 8 is configured to detect whether a plate 100 to be transported is located at the entrance 24. If the plate is located at the entrance 24, the detection apparatus transmits a signal to the drive system 3 to start the transport apparatus 1. In this embodiment, the detection apparatus 8 includes an abutting plate 80 and a sensor 81. The abutting plate 80 is disposed at the entrance 24 for abutting the plate. The sensor 81 is configured to detect whether the abutting plate 80 is abutted and moved by the plate 100. In another embodiment (not shown), the detection apparatus 8 includes at least one photoelectric sensor 81, configured to detect whether a plate is located in a detection area, and transmit a signal to the drive system 3 to start the transport apparatus. In this embodiment, the abutting plate 80 pivots when the plate abuts the abutting plate 80.

In an embodiment of the present disclosure, the detection apparatus 8 further includes a guide roller 82, configured to abut the plate to guide a movement path of the plate. A guide roller 82 may be connected to a spring (not shown) so that when the plate abuts the guide roller 82, the spring helps to restore the guide roller 82 to its original position. In another embodiment, the sensor 81 is mechanically coupled to the guide roller 82. Thus, when the guide roller 82 is moved by the plate 100, the sensor 81 transmits a start signal to the drive system 3.

In addition, in an embodiment of the present disclosure, the transport apparatus 1 includes a protection switch (not shown), such as a button, disposed on the shell 2, configured to immediately start and/or stop the operation of the drive system 3. In another embodiment, the switch may be in the form of a pedal, and a user may step on the pedal to immediately start and/or stop the operation of the drive system 3. The housing of the switch may be made of resin and is IP65 waterproof.

In an embodiment of the present disclosure, the transport apparatus 1 may include a coating apparatus (not shown) disposed in the exit 25 of the shell 2 for automatically applying mold release oil to the plate 100, when the plate 100 is discharged from the exit 2.

Operation of the transport apparatus 1 according to an embodiment disclosed in this embodiment is as follows. First, referring to FIG. 3, according to the thickness of the plate 100, a first operator pulls the controlling rod 9 to adjust the first distance W1 between the first roller 40 and the first adjustment roller 41 to approximately equal thickness of the plate 100. Next, a second operator feeds the plate 100 from the entrance 24 into the transport apparatus 1. In one embodiment, the controlling rod 9 may be selectively fixed in a particular position by a locking mechanism (not shown) to maintain the first distance W1. In the initial situation, the first adjustment spring 45 and the second adjustment spring 55 provide tension to the first frame 42 and the second frame 52 respectively. The first adjustment roller 41 and the second adjustment roller 51 are not in contact with the plate 100, the rod 41a of the first adjustment roller 41 and the rod 51a of the second adjustment roller 51 are respectively subject to tension applied by the first compression spring 46 and the second compression spring 56, and are respectively retained on left sides of the first adjustment slot 44 and the second adjustment slot 54 as shown in FIG. 2. In addition, the end of the first compression spring 46 connected to the first adjustment roller 41 is also located on the left side of the first guide slot 47 of the first frame 42, and the end of the second compression spring 56 connected to the second adjustment roller 51 is also located on the left side of the second guide slot 57 of the second frame 52.

Figure 4:
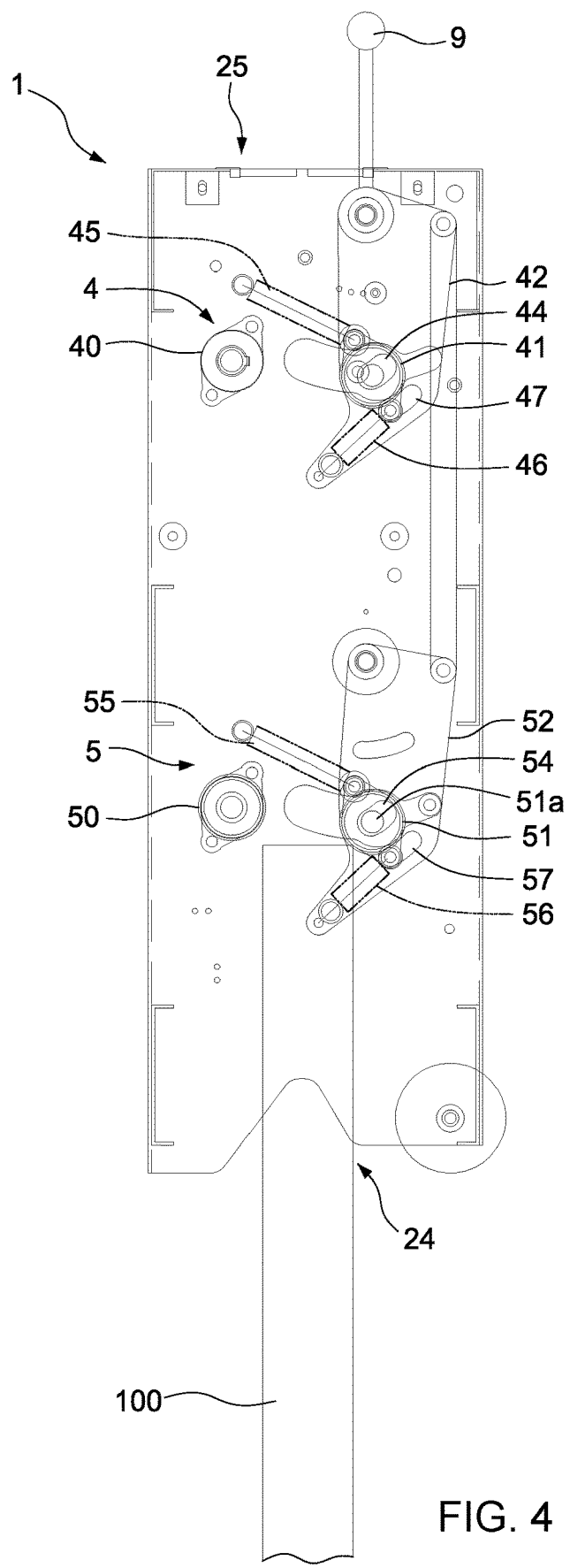
FIG. 4 is a schematic view showing a second action of the embodiment of the present disclosure.

FIG. 4 is a schematic view showing a second action of a transport apparatus 1 according to an embodiment of the present disclosure. As shown, when the detection apparatus 8 (as shown in FIG. 2) detects the plate 100 (for example, the plate 100 is in contact with the abutting plate 80 of the detection apparatus 8), the detection apparatus 8 transmits a signal to the drive system 3 (as shown in FIG. 2), and the drive system 3 starts the first roller 40 and the second roller 50 rotating synchronously.

Figure 5:
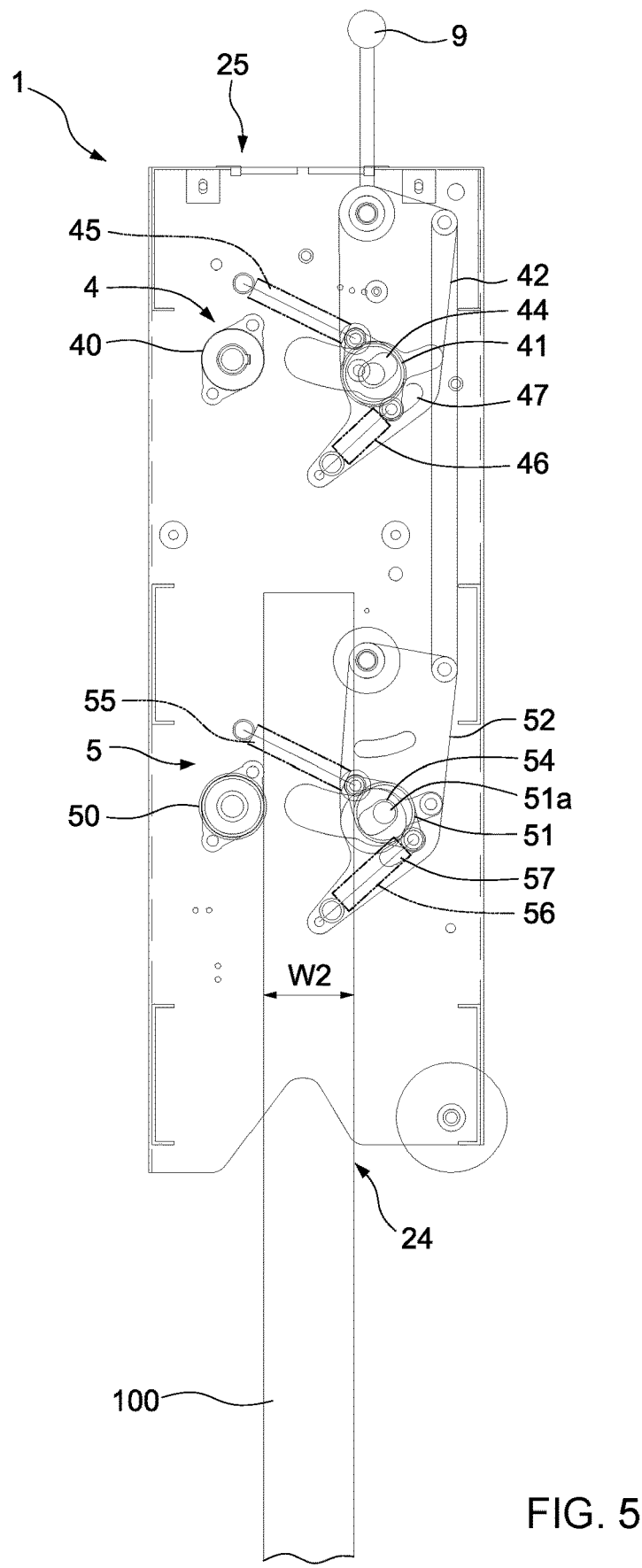
FIG. 5 is a schematic view showing a third action of the embodiment of the present disclosure.

FIG. 5 is a schematic view showing a third action of a transport apparatus 1 according to an embodiment of the present disclosure. As shown in FIG. 5, when the plate 100 enters the second set of rollers 5, the plate 100 moves upward along with the rotation of the second roller 50, and then toward the exit 25. In addition, when the second distance W2 between the second roller 50 and the second adjustment roller 51 is slightly less than the thickness of the plate 100, the plate 100 abuts and pushes the second adjustment roller 51. The rod 51a of the second adjustment roller 51 then moves toward the right end of the second adjustment slot 54, to enable the second distance W2 between the second roller 50 and the second adjustment roller 51 to equal or slightly exceed thickness of the plate 100. Correspondingly, the end of the second compression spring 56 connected to the second adjustment roller 51 is also pushed to the right side of the second guide slot 57. Consequently, the second compression spring 56 applies tension to the second adjustment roller 51 to enable the second adjustment roller 51 to abut and stabilize the plate 100 to move upward.

Figure 6:
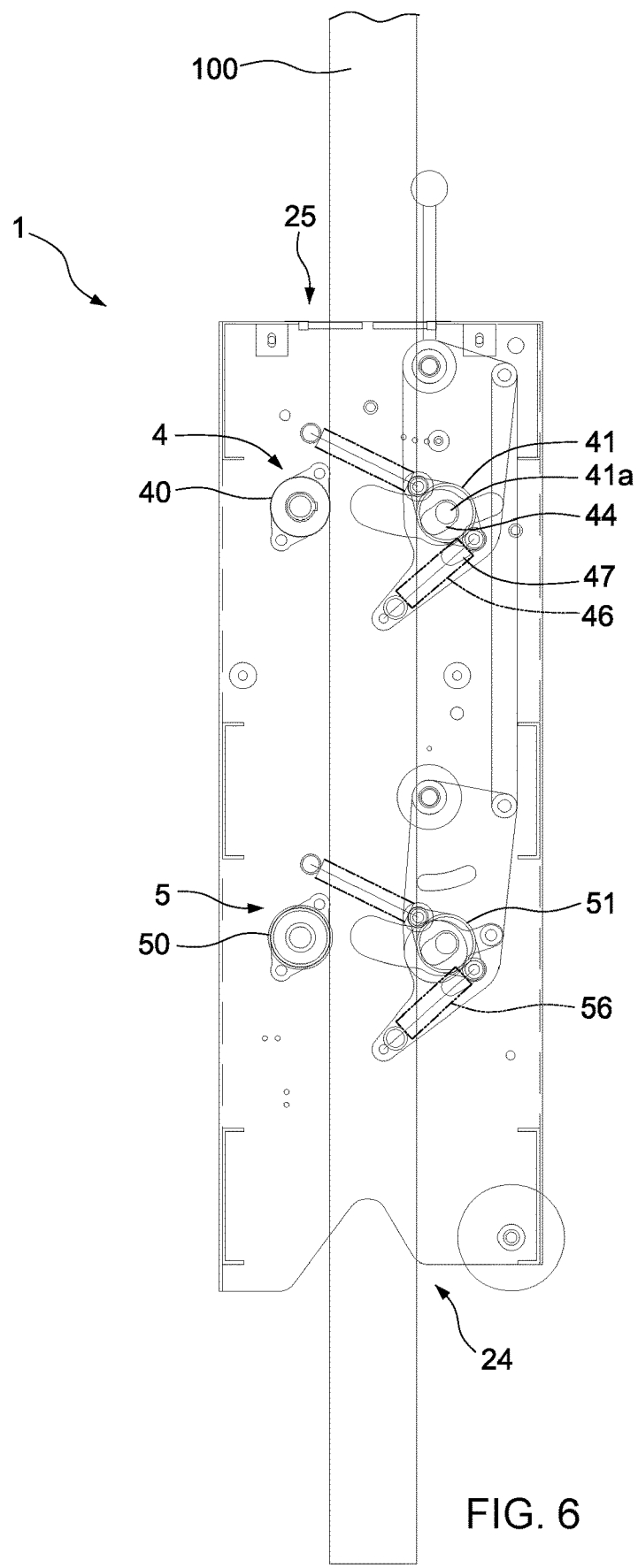
FIG. 6 is a schematic view showing a fourth action of the embodiment of the present disclosure.

FIG. 6 is a schematic view showing a fourth action of a transport apparatus 1 according to an embodiment of the present disclosure. As shown in FIG. 6, when the plate 100 enters the first set of rollers 4, the plate 100 keeps moving upward and toward the exit 25 along with the rotation of and contacts with the first roller 40 and the second roller 50. In addition, when the first distance W1 between the first roller 40 and the first adjustment roller 41 is slightly less than the thickness of the plate 100, the plate 100 abuts and pushes the first adjustment roller 41. The rod 41a of the first adjustment roller 41 then moves toward the right end of the first adjustment slot 44 so that the first distance W1 is generally equal to the thickness of the plate 100. Correspondingly, the end of the first compression spring 46 connected to the first adjustment roller 41 is pushed to the right side of the first guide slot 47. Consequently, the first compression spring 46 deforms and applies tension to the first adjustment roller 41, to enable the first adjustment roller 41 to abut the plate 100, so that the plate 100 is stabilized and may stably move toward the exit 25.

Figure 7:
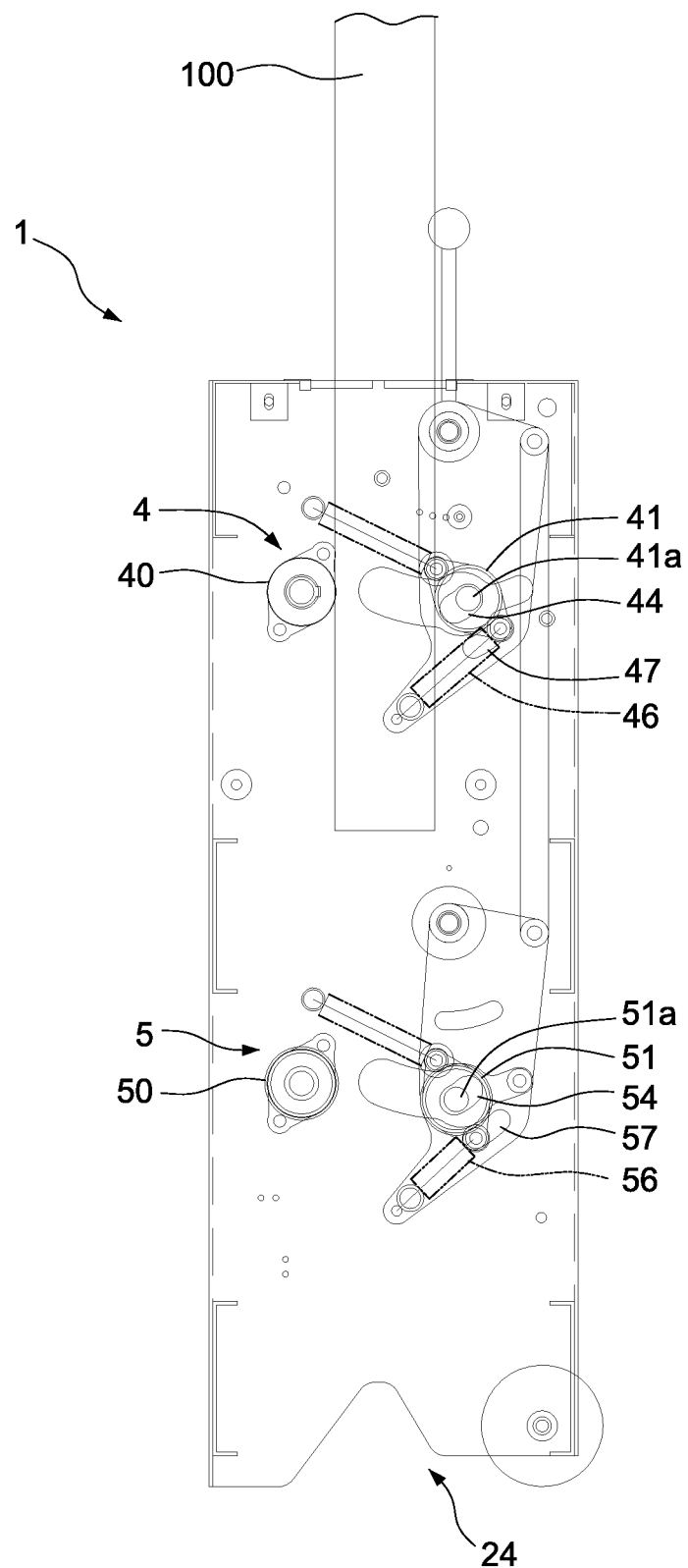
FIG. 7 is a schematic view showing a fifth action of the embodiment of the present disclosure.

FIG. 7 is a schematic view showing a fifth action of a transport apparatus 1 according to an embodiment of the present disclosure. As shown in FIG. 7, when the plate 100 keeps moving upward and leaves the second set of rollers 5, it is only subject to the rotational force provided by the first roller 40. Since the plate 100 has left the second set of rollers 5, the second adjustment roller 51 returns to its original position under the tension applied by the second compression spring 56. That is, the rod 51a of the second adjustment roller 51 in FIG. 7 is pulled by the second compression spring 56 to move toward the left end of the second adjustment slot 54. Consequently, the end of the second compression spring 56 connected to the second adjustment roller 51, is also pulled back to the left side of the second guide slot 57.

Figure 8:
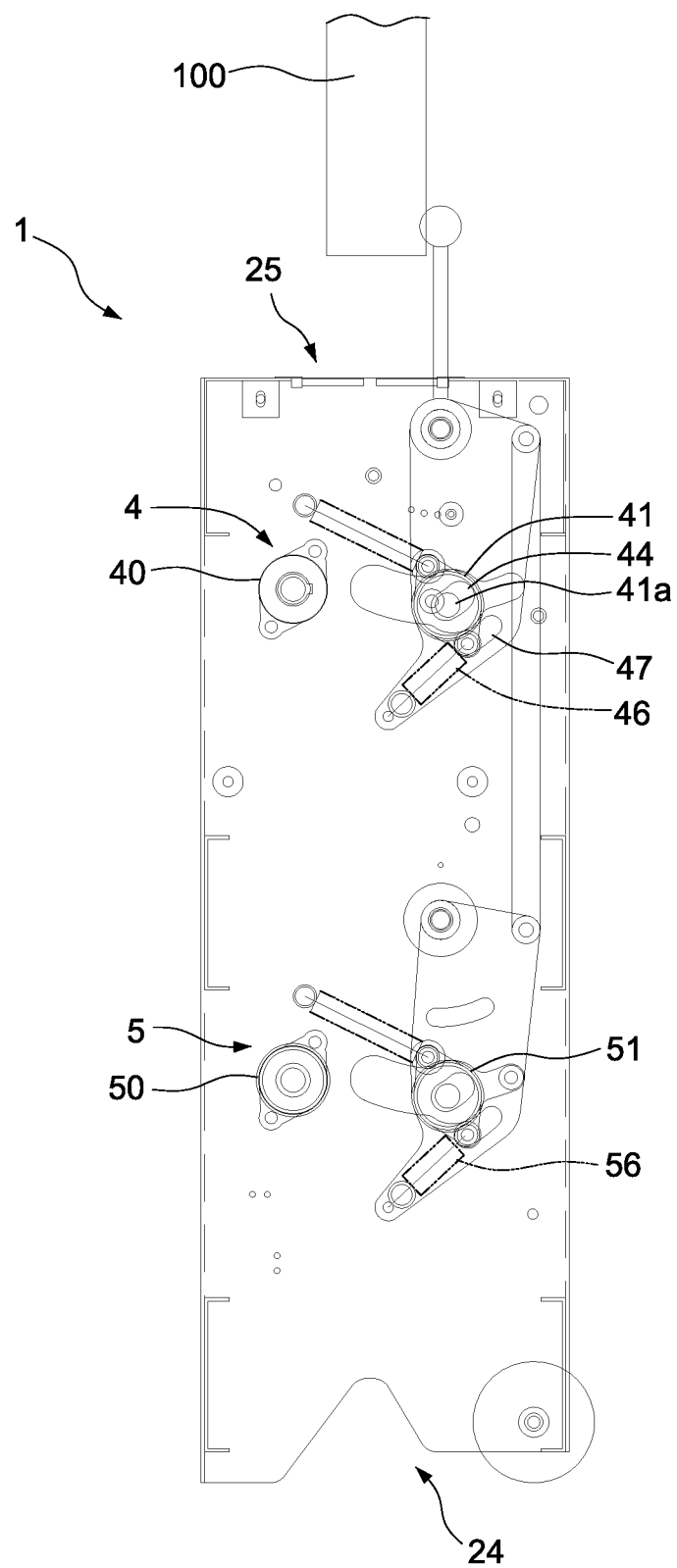
FIG. 8 is a schematic view showing a sixth action of the embodiment of the present disclosure.

FIG. 8 is a schematic view showing a sixth action of a transport apparatus 1 according to an embodiment of the present disclosure. As shown, when the plate 100 continues upward and leaves the first set of rollers 4, it is ready to be removed from the exit 25. Since the plate 100 has left the first set of rollers 4, the first adjustment roller 41 returns to its original position under the tension of the first compression spring 46. That is, the rod 41a in FIG. 8 moves toward the left end of the first adjustment slot 44. Consequently, the end of the first compression spring 46 connected to the first adjustment roller 41 is also pulled back to the left side of the first guide slot 47.

In an embodiment of the present disclosure, the drive system 3 includes a timer (not shown) and when the drive system 3 starts, the timer starts to count. After a preset time (for example, 10 seconds, that is, a time set for a plate 100 to move from the entrance 24 to the exit 25), the timer may transmit a stop signal, to enable the drive system 3 to stop operation so as to save power. In another embodiment of the present disclosure, a user may manually start or stop the drive system 3.

In an embodiment of the present disclosure, the transport apparatus 1 includes a protective net (not shown), detachably covering the exit 25 for preventing users from accidently reaching into the exit or foreign objects from entering therein.

When a user wishes to move the transport apparatus 1 to a higher floor, a crane may be used, by which transport apparatus 1 is lifted upward via a through hole (for example, an elevator shaft) from the lower floor to a through hole of the upper floor, and supporting guide rails 30 of the transport apparatus 1 are disposed at the circumferences of the through hole of the upper floor.

In summary, by means of the transport apparatus 1 disclosed in the present disclosure, the efficiency of transporting the plate 100 is significantly improved and construction costs reduced. In addition, the transport apparatus 1 is suitable for plates 100 of different thicknesses.

The terminology used in the description of the present disclosure is for the purpose of describing particular embodiments only, and is not intended to limit the disclosure. As used in the description of the disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items.

It shall be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The use of directional adjectives "above," "under," "upper," "lower," "below," "left," "right," "up," "down," "top," "bottom," "vertical," "horizontal," and like terms, are meant to assist with understanding relative relationships among design elements and should not be construed as meaning an absolute direction in space nor regarded as limiting. For example, in some embodiments, "a first component is on a second component" describes the first component being on the second component (the first component is directly on the second component), some other components between the first and second components.

Terms such as "approximately," "substantially," or "about" are applied to describe a small variation of a structural unit of an apparatus. When a term is used in conjunction with another term to describe a particular characteristic of the claimed disclosure, such term can indicate the exact events or circumstances, and similar exact events or circumstances.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A transport apparatus for transporting a plate, the transport apparatus comprising:
a shell, comprising an entrance and an exit that are disposed opposite to each other in relation to the shell;
a drive system, disposed on the shell;
a first set of rollers, disposed in the shell, the first set of rollers comprising:
a first roller, electrically coupled to the drive system and configured to be rotated by the drive system;
a first adjustment roller, movably disposed in the shell and configured to adjust a first distance between the first roller and the first adjustment roller; and
a first frame, having an end pivotally disposed in the shell;
wherein the shell has a first slot disposed therein, the first adjustment roller has a first portion disposed in the first slot, and the first adjustment roller is movable along the first slot;
wherein the first slot is generally arc-shaped and has a first end, a second end and a middle portion wherein the first end is opposite to the second end and the middle portion is between the first end and the second end; and
wherein the first frame comprises a first positioning member thereon, wherein the first adjustment roller is movable along the first slot between the first end and the middle portion, and the first positioning member is correspondingly movable along the first slot between the middle portion and the second end.

2. The transport apparatus of claim 1, wherein the maximum diameter of the second end of the first slot is less than the maximum diameters of the first end and the middle portion.

3. The transport apparatus of claim 1, wherein the first set of rollers further comprises:
a first adjustment spring, having opposing ends fixed to the shell and the first frame; and
a compression spring, having opposing ends fixed to the first frame and the first adjustment roller.

4. The transport apparatus of claim 3, wherein the first frame has a first adjustment slot therein, the first adjustment roller having a second portion disposed in the first adjustment slot, the first adjustment roller being disposed between the shell and the first frame, wherein when the first frame is moved, the first adjustment roller is actuated to move simultaneously within the first slot and the first adjustment slot, and wherein the second portion of the first adjustment roller is opposite to the first portion of the first adjustment roller.

5. The transport apparatus of claim 1, further comprising:
a second set of rollers, disposed in the shell, the second set of rollers comprising:
a second roller, electrically coupled to the drive system and configured to be rotated by the drive system; and
a second adjustment roller, movably disposed in the shell, and configured to adjust a second distance between the second roller and the second adjustment roller.

6. The transport apparatus of claim 5, further comprising a lever having a first end and a second end, wherein the first end is pivotally connected to the first set of rollers and the second end is pivotally connected to the second set of rollers.

7. The transport apparatus of claim 6, wherein the second set of rollers further comprises:
a second frame, having an end pivotally disposed in the shell;

wherein the shell has a second slot disposed therein, the second adjustment roller has a first portion disposed in the second slot, and the second adjustment roller is movable along the second slot.

8. The transport apparatus of claim 7, wherein the second slot is generally arc-shaped and has a first end, a second end, and a middle portion wherein the first end is opposite to the second end and the middle portion is between the first end and the second end.

9. The transport apparatus of claim 8, wherein the second frame comprises a second positioning member thereon, wherein the second adjustment roller is movable along the second slot between the second end and the middle portion, and the second positioning member is correspondingly movable along the second slot between the middle portion and the second end.

10. The transport apparatus of claim 9, wherein the maximum diameter of the second end of the second slot is less than the maximum diameters of the first end and the middle portion.

11. The transport apparatus of claim 10, wherein the second set of rollers further comprises:
a second adjustment spring, having opposing ends fixed to the shell and the second frame; and
a compression spring, having opposing ends fixed to the second frame and the second adjustment roller.

12. The transport apparatus of claim 11, wherein the second frame has a second adjustment slot therein, the second adjustment roller having a second portion disposed in the second adjustment slot, the second adjustment roller being disposed between the shell and the second frame; when the second frame is moved, the second adjustment roller is actuated to move simultaneously within the second slot and the second adjustment slot, wherein the second portion of the second adjustment roller is opposite to the second portion of the second adjustment roller.

13. The transport apparatus of claim 6, wherein the first set of rollers is disposed near the exit and the second set of rollers is disposed between the entrance and the first set of rollers.

14. The transport apparatus of claim 6, further comprising: at least one guide plate disposed in the shell and located between the first set of rollers and the second set of rollers for guiding the transportation of the plate.

15. The transport apparatus of claim 6, further comprising a detection apparatus, disposed between the second set of rollers and the entrance, wherein the detection apparatus is electrically connected to the drive system and is for detecting whether the plate is placed in the entrance, and sending an actuating signal to the drive system when the plate is placed in the entrance.

16. The transport apparatus of claim 15, wherein the detection apparatus comprises:
an abutting plate disposed in the entrance for abutting the plate; and
a sensor for detecting whether the abutting plate is moved.

17. The transport apparatus of claim 1, further comprising:
a controlling rod fixed to the first frame for moving the first frame;
at least one support provided at a first side of a bottom of the shell; and
at least one wheel, disposed at a second side of the bottom of the shell, the first side being opposite to the second side.

* * * * *